Aug. 20, 1929.          P. CIFERSKOR                1,725,130
                         LINE TIGHTENER
                       Filed March 31, 1928
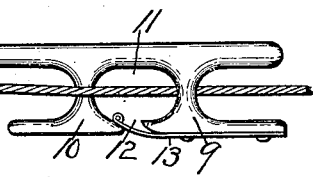
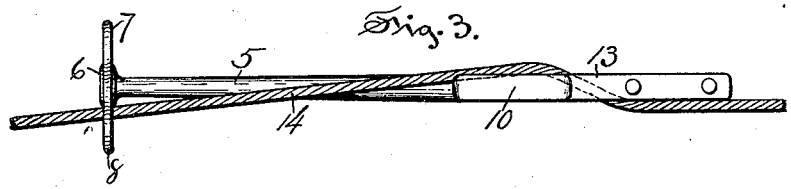
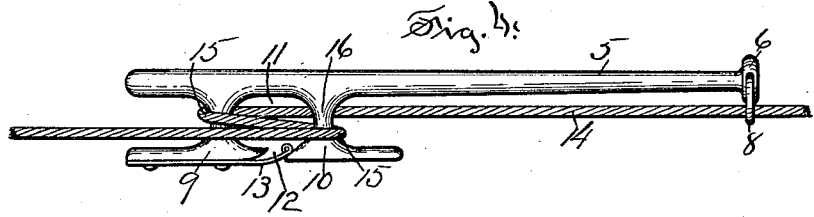
INVENTOR
Peter Ciferskor
By
Arthur B. Jenkins
ATTORNEY Patented Aug. 20, 1929.

1,725,130

UNITED STATES PATENT OFFICE.

PETER CIFERSKOR, OF HARTFORD, CONNECTICUT.

LINE TIGHTENER.

Application filed March 31, 1928. Serial No. 266,310.

My invention relates to the class of devices used for taking up the slack in lines, the device being particularly adapted for use in connection with a pulley clothes line, although not restricted to such, and an object of my invention, among others, is the production of a tightener that is always in position for use and one having means for readily securing it in any position it may be placed in.

One form of tightener embodying my invention and in the construction and use of which the objects herein set out, as well as others, may be attained, is illustrated in the accompanying drawings, in which—

Figure 1 is an end view of my improved tightener.

Figure 2 is a side view of the same.

Figure 3 is an edge view.

Figure 4 is a side view looking at the opposite side of the tightener from that shown in Figure 1 and illustrating its operation.

In the accompanying drawings the numeral 5 denotes the stock or shank of my improved tightener preferably formed of metal and that may be of any desired shape, as shown herein this being round in cross section. A head 6 is formed at one end of the shank and holding hooks 7—8 are located on opposite sides of the head, the bases of the hooks being preferably at the under side of said hook and the latter opening upwardly.

A chock is formed at the end of the stock opposite the hooks just described, this chock comprising two T-shaped members 9—10 spaced to provide a line opening 11. The cross pieces of said members at their adjacent ends are separated to provide a mouth 12 into the opening 11 and a spring retainer 13 is secured to one of the members and projects across said mouth underneath the cross piece of the other member, and as shown in Figure 2 of the drawing.

This construction provides means to retain the tightener in place upon a line 14 so that it is always in readiness for use and not liable to be lost or mislaid.

In use the holder is placed upon the line by slipping the latter past the spring 13, that yields to permit this, and into the opening 11, and one of the hooks 7 is engaged with the line, as shown in Figures 1 and 2. When the line becomes loose, as by drying out, and it is desired to tighten it the hook 7 or 8 is disengaged from the line and the tightener is turned to the position shown in Figure 4, thus creating loops 15 around the necks 16 of the members comprising the chock. One of the hooks, as 8, is engaged with the line to prevent the holder from turning, by the strain now created, to its former position and from which it was rotated to take up the slack.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A line tightener comprising a stock, a chock located at one end of the stock and having a line opening and a reduced mouth thereinto, yieldable means mounted on one side of the mouth and entering the opening crosswise of the mouth to close the latter, and a hook to receive said line at the opposite end of the stock from said chock.

2. A line tightener comprising a stock, a chock located at one end of the stock and having a line opening and a mouth thereinto, means for temporarily closing said opening, and laterally projecting hooks located on opposite sides of the stock at the opposite end thereof from said chock to receive a line passing from said chock, said hooks opening toward the stock.

3. A line tightener comprising a stock, a chock located at one end of the stock and having a line opening and a restricted mouth thereinto, a spring retainer projecting across said mouth and into the opening through the mouth to temporarily retain a line in said opening, and a hook located at the opposite end of the stock from said chock to receive a line.

4. A line tightener comprising a stock, a chock located at one end of the stock and comprising two members connected to the stock at spaced points to provide a line opening between them, means for temporarily closing a mouth into said opening, and a hook located at the opposite end of the stock from said chock, the entrance into the loop in the hook opening in a direction toward the stock and transverse to the line of force applied to the line with the tightener in operation to hold said line taut.

5. A line tightener comprising a stock, a chock located at one end of the stock and comprising two T-shaped members having their cross parts spaced from the stock and with their adjacent ends located to provide a restricted mouth to an opening between said members, yieldable means mounted on one side of the mouth and entering the opening crosswise of the mouth to close the latter, and a hook located at the opposite end of the stock to receive a line.

PETER CIFERSKOR.